(12) United States Patent
Kuwata

(10) Patent No.: US 9,544,616 B2
(45) Date of Patent: Jan. 10, 2017

(54) VIDEO TRANSMISSION APPARATUS

(71) Applicant: Kohji Kuwata, Kanagawa (JP)

(72) Inventor: Kohji Kuwata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/194,959

(22) Filed: Mar. 3, 2014

(65) Prior Publication Data

US 2014/0267808 A1   Sep. 18, 2014

(30) Foreign Application Priority Data

Mar. 12, 2013   (JP) .................... 2013-049680

(51) Int. Cl.
*H04N 19/57*   (2014.01)
*H04N 19/56*   (2014.01)
*H04N 19/134*   (2014.01)
*H04N 19/46*   (2014.01)
*H04N 19/164*   (2014.01)

(52) U.S. Cl.
CPC ............ *H04N 19/57* (2014.11); *H04N 19/134* (2014.11); *H04N 19/56* (2014.11); *H04N 19/164* (2014.11); *H04N 19/46* (2014.11)

(58) Field of Classification Search
CPC .... H04N 19/50; H04N 19/503; H04N 19/507; H04N 19/51; H04N 19/513; H04N 19/517; H04N 19/52; H04N 19/521; H04N 19/523; H04N 19/527; H04N 19/53; H04N 19/533; H04N 19/537; H04N 19/54; H04N 19/543; H04N 19/547; H04N 19/553; H04N 19/55; H04N 19/557; H04N 19/56; H04N 19/563; H04N 19/567; H04N 19/57;H04N 19/573; H04N 19/577; H04N 19/58; H04N 19/583; H04N 19/587; H04N 19/59; H04N 19/593; H04N 19/597; H04N 19/60; H04N 19/61; H04N 19/615; H04N 19/619; H04N 19/62; H04N 19/625; H04N 19/63; H04N 19/635; H04N 19/64; H04N 19/645; H04N 19/647; H04N 19/649; H04N 19/00703
(Continued)

(56) References Cited

U.S. PATENT DOCUMENTS 6,507,366 B1 *   1/2003   Lee .................. G06T 7/2013
                                                                348/169
7,433,524 B2   10/2008   Yamaguchi et al.
(Continued)

FOREIGN PATENT DOCUMENTS

JP   06-038204   2/1994
JP   06-133301   5/1994
(Continued)

*Primary Examiner* — Pritham Prabhakher
(74) *Attorney, Agent, or Firm* — IPUSA, PLLC

(57) ABSTRACT

A video transmission apparatus includes a camera controller that obtains camera movement amount data indicating a direction and an amount of movement of a camera, and an image encoder that performs motion compensation on image data received from the camera and determines an image search range for the motion compensation based on the camera movement amount data. The image encoder adjusts a motion vector indicated by the camera movement amount data for each coordinate position in the image data based on a lens characteristic of the camera, and determines the image search range for the motion compensation based on the adjusted motion vector for each coordinate position.

17 Claims, 5 Drawing Sheets

(58) Field of Classification Search
USPC .................................................. 348/208.6
See application file for complete search history.

(56) References Cited

U.S. PATENT DOCUMENTS

| | | | | | |
|---|---|---|---|---|---|
| 7,894,531 | B1* | 2/2011 | Cetin | ................... | H04N 19/176 375/240.19 |
| 8,385,628 | B2* | 2/2013 | Shimizu | ............... | H04N 19/597 382/154 |
| 8,477,173 | B2* | 7/2013 | Kenoyer | ................ | H04N 7/142 348/14.08 |
| 8,854,486 | B2* | 10/2014 | Tian | ..................... | H04N 19/008 348/218.1 |
| 2002/0057348 | A1* | 5/2002 | Miura | ................... | H04N 5/232 348/211.4 |
| 2005/0270380 | A1* | 12/2005 | Tomita et al. | ........... | 348/208.99 |
| 2006/0158509 | A1* | 7/2006 | Kenoyer | ................ | H04N 7/142 348/14.08 |
| 2008/0126278 | A1* | 5/2008 | Bronstein | ............ | G06T 7/2006 706/17 |
| 2008/0151078 | A1* | 6/2008 | Konno | ................. | G01S 3/7864 348/240.99 |
| 2009/0153680 | A1* | 6/2009 | Shibata | ...................... | 348/208.6 |
| 2009/0285301 | A1* | 11/2009 | Kurata | ................... | H04N 19/51 375/240.16 |
| 2011/0109753 | A1* | 5/2011 | Srinivasamurthy | .... | H04N 19/46 348/208.4 |
| 2011/0206124 | A1* | 8/2011 | Morphet | ............... | G06T 7/2013 375/240.16 |
| 2011/0255796 | A1* | 10/2011 | Nakamura | ........... | H04N 19/597 382/232 |
| 2012/0194685 | A1* | 8/2012 | Kawakami | ............ | H04N 5/217 348/208.1 |
| 2013/0016180 | A1* | 1/2013 | Ono | ....................... | H04N 5/145 348/36 |
| 2013/0021483 | A1* | 1/2013 | Bennett | .................. | H04N 19/56 348/208.4 |
| 2013/0044825 | A1* | 2/2013 | Jalowiecki | ........... | H04N 19/176 375/240.26 |
| 2013/0329072 | A1* | 12/2013 | Zhou et al. | ................ | 348/222.1 |
| 2014/0266900 | A1* | 9/2014 | Kasher | .......................... | 342/372 |

FOREIGN PATENT DOCUMENTS

| | | |
|---|---|---|
| JP | 2693574 | 12/1997 |
| JP | 2004-336404 | 11/2004 |

* cited by examiner

VIDEO TRANSMISSION APPARATUS

CROSS-REFERENCE TO RELATED APPLICATION

The present application is based upon and claims the benefit of priority of Japanese Patent Application No. 2013-049680, filed on Mar. 12, 2013, the entire contents of which are incorporated herein by reference.

BACKGROUND OF THE INVENTION

1. Field of the Invention

An aspect of this disclosure relates to a video transmission apparatus.

2. Description of the Related Art

A video transmission apparatus used, for example, for a conference system typically includes an image coding unit that encodes and compresses image data captured by a camera to transmit image data or an image signal (or a video signal) with desired quality to a remote apparatus via a network with a limited bandwidth.

The image coding unit employs inter-frame prediction coding where a difference between an immediately-preceding frame and a current frame is transmitted, and motion processing where a motion compensation vector indicating a movement of a part of an image is transmitted.

A video transmission apparatus also includes a panning function for changing the direction (orientation or angle) of a camera horizontally and a tilting function for changing the direction of the camera vertically, i.e., functions to adjust the angle (orientation or direction) of the camera in response to a user operation.

When the direction of the camera is changed at a high speed with the panning and tilting functions while capturing images, changes in the images caused by the directional change of the camera are added to changes in the images caused by the movement of an object such as a person.

For this reason, a motion compensation vector detection unit of a video transmission apparatus needs to detect a movement (or a change between adjacent frames) that is a combination of a movement of a moving object (e.g., a person) and a directional change of the camera. This in turn increases the time necessary to detect an amount of movement and reduces detection efficiency. That is, when the camera is not moved, the motion compensation vector detection unit needs to search only a range that is predictable based on an immediately preceding movement of an object. On the other hand, when the camera is moved, the motion compensation vector detection unit needs to expand the search range and this increases processing time. When the search range is not wide enough, it is not possible to properly detect the amount of movement. As a result, a large error occurs in an inter-frame prediction image calculated by motion compensation, and coding efficiency is drastically reduced.

Japanese Laid-Open Patent Publication No. 06-38204 discloses an image signal transmission apparatus. In the disclosed image signal transmission apparatus, to solve the above problems, a camera movement amount signal (motion vector) indicating the direction and amount of movement of a camera is input to an image coding unit, and a motion compensation vector detection unit shifts the search range according to the direction and the amount of movement indicated by the motion vector and detects a motion compensation vector by comparing images within the shifted search range.

The related-art method using a camera movement amount signal is effective in a case where the same motion vector is applicable to the entire frame (image or screen). However, the related-art method is not suitable for a case where the same motion vector is not applicable to the entire frame (image or screen) due to the distortion and a projection method of a lens. When the same motion vector is applied without change in the latter case, a proper motion compensation vector cannot be detected. As a result, a large error occurs in an inter-frame prediction image calculated by motion compensation, and coding efficiency is drastically reduced. When the search range is expanded to cope with this problem, it is contrary to the object of the related-art method, i.e., improving the processing efficiency by narrowing the search range.

A camera for a conference system generally uses a wide angle lens (whose angle of view is greater than 60 degrees) that causes great image distortion, and is therefore greatly affected by the above problems. The same can be said to an around-view monitor camera.

SUMMARY OF THE INVENTION

In an aspect of this disclosure, there is provided a video transmission apparatus including a camera controller that obtains camera movement amount data indicating a direction and an amount of movement of a camera, and an image encoder that performs motion compensation on image data received from the camera and determines an image search range for the motion compensation based on the camera movement amount data. The image encoder adjusts a motion vector indicated by the camera movement amount data for each coordinate position in the image data based on a lens characteristic of the camera, and determines the image search range for the motion compensation based on the adjusted motion vector for each coordinate position.

DESCRIPTION OF THE PREFERRED EMBODIMENTS

Preferred embodiments of the present invention are described below with reference to the accompanying drawings.

<Configuration and Operations>

Figure 1:
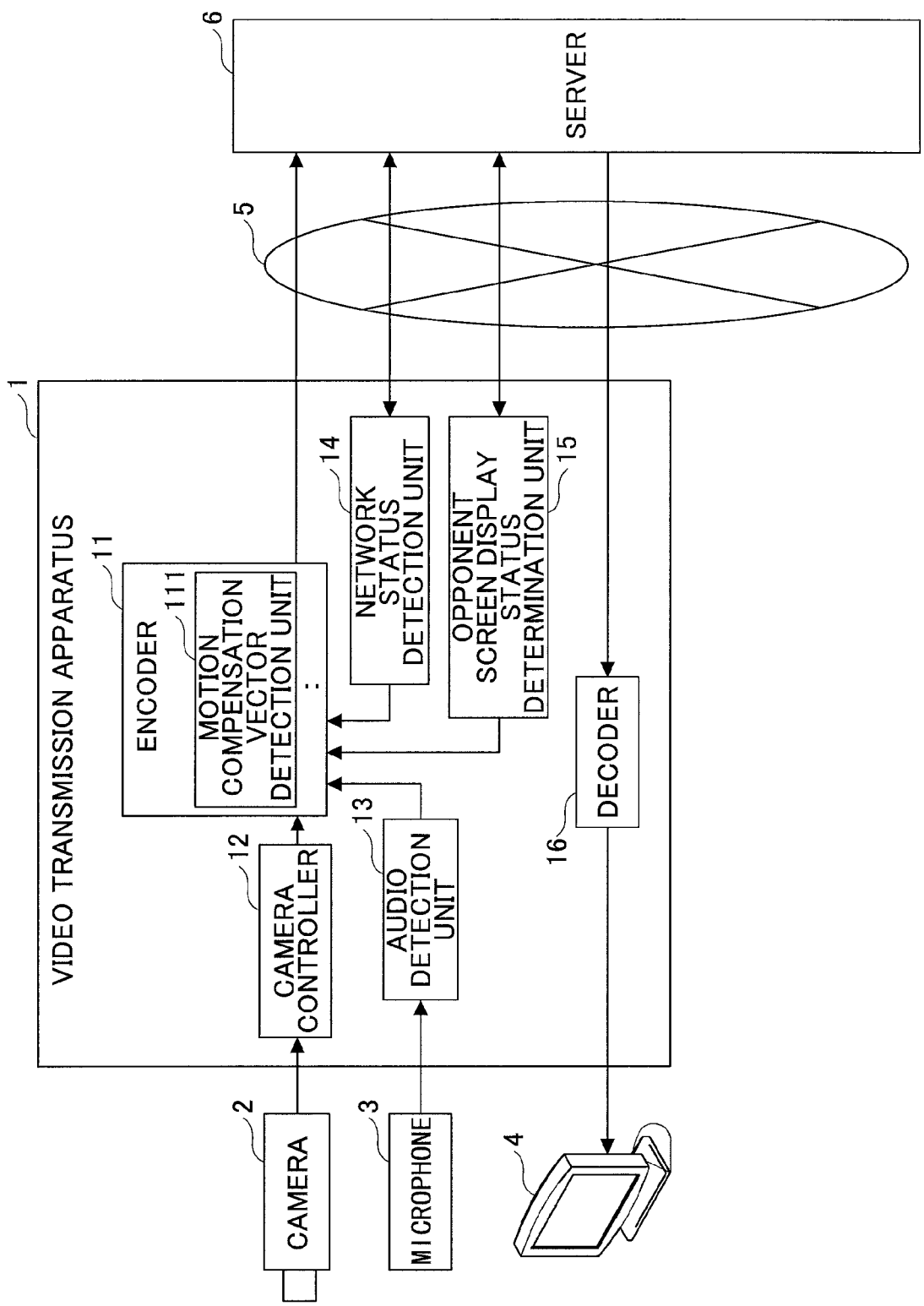
FIG. 1 is a drawing illustrating an exemplary configuration of a conference system.

FIG. 1 is a drawing illustrating an exemplary configuration of a conference system according to an embodiment of the present invention.

As illustrated by FIG. 1, the conference system includes a video transmission apparatus 1, and a camera 2, a microphone 3, and a monitor 4 that are connected to the video transmission apparatus 1. The video transmission apparatus 1 is also connected via a network 5 such as the Internet to a server 6. Here, it is assumed that an opponent video transmission apparatus of another conference participant is also connected to the server 6. The server 6 controls connection and transmission of video (including sound) between the video transmission apparatus 1 and the opponent video transmission apparatus.

The video transmission apparatus 1 includes an encoder 11, a camera controller 12, an audio detection unit 13, a network status detection unit 14, an opponent screen display status determination unit 15, and a decoder 16. The encoder 11 includes a motion compensation vector detection unit 111.

An image signal (data or information) from the camera 2 is input via the camera controller 12 to the encoder 11. Here, it is assumed that the image signal represents a video that includes multiple frames (images or screens). The motion compensation vector detection unit 111 of the encoder 11 detects the amount of movement between a preceding frame and a current frame. The encoder 11 generates a predicted frame similar to the current frame by moving an object in the preceding frame by the detected amount of movement, obtains a difference between the predicted frame and the current frame, and transmits the obtained difference together with motion information to achieve band compression.

An audio signal (data or information) from the microphone 3 is input via the audio detection unit 13 to the encoder 11 that encodes the audio signal (data or information) and outputs the encoded audio signal (data or information).

The network status detection unit 14 detects a network status, and the opponent screen display status determination unit 15 determines a screen display status of the opponent video transmission apparatus. The coding level at the encoder 11 is controlled based on the detected network status and the determined screen display status.

The decoder 16 decodes an image signal (data or information) and an audio signal (data or information) transmitted from the opponent video transmission apparatus, and outputs the decoded image signal (data or information) and audio signal (data or information) to the monitor 4 (including a speaker).

Figure 2:
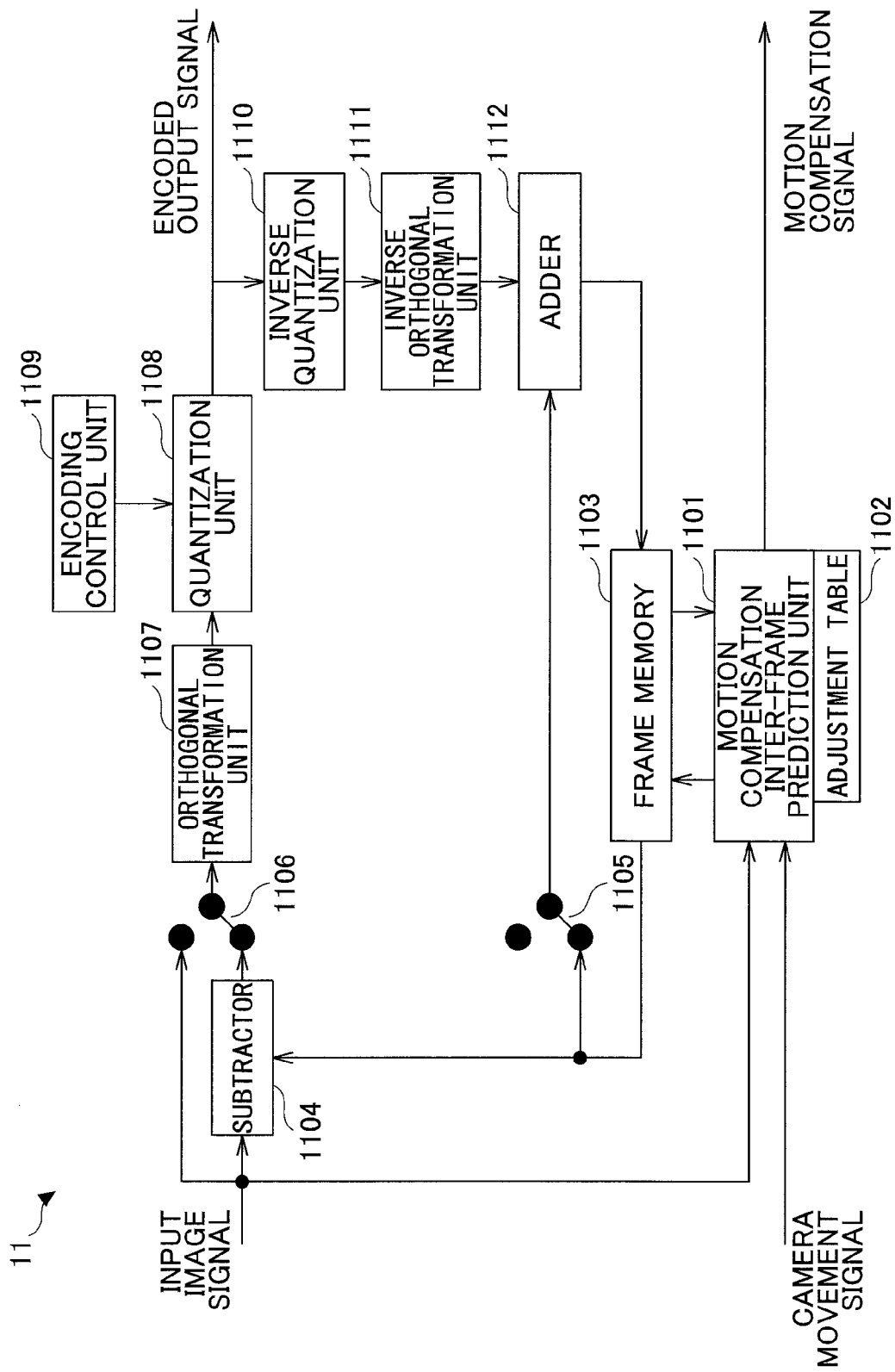
FIG. 2 is a drawing illustrating an exemplary configuration of an encoder.

FIG. 2 is a drawing illustrating an exemplary configuration of the encoder 11.

As illustrated by FIG. 2, the encoder 11 includes a motion compensation inter-frame prediction unit 1101, an adjustment table 1102, a frame memory 1103, a subtractor 1104, switches 1105 and 1106, an orthogonal transformation unit 1107, a quantization unit 1108, an encoding control unit 1109, an inverse quantization unit 1110, an inverse orthogonal transformation unit 1111, and an adder 1112. The motion compensation inter-frame prediction unit 1101, the adjustment table 1102, and the frame memory 1103 constitute the motion compensation vector detection unit 111 in FIG. 1.

Next, the adjustment table 1102 is described.

When the direction of the camera 2, such as a pan-and-tilt camera that can freely change shooting directions, is changed, all blocks in a frame move in the same direction. Therefore, it is preferable to store information regarding directional changes in the encoder 11 to enable the encoder 11 to predict a movement of an object and easily detect a motion compensation vector.

Figure 3A:
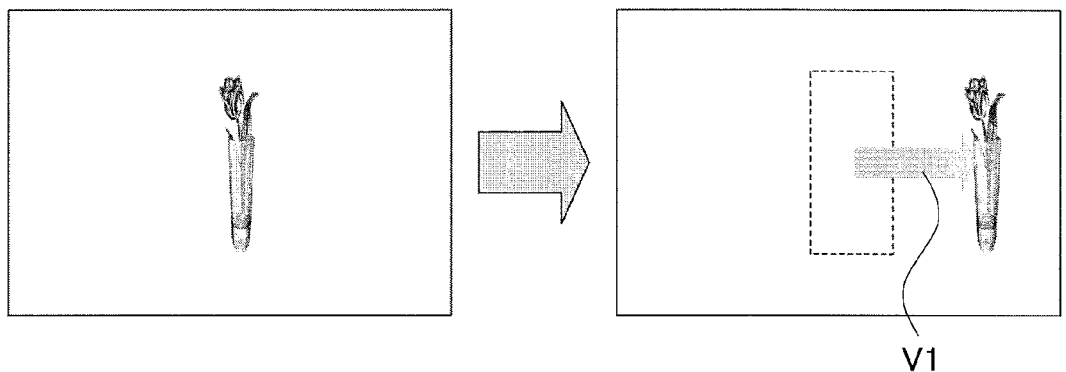
FIG. 3A and FIG. 3B are drawings used to describe a motion compensation vector.

FIG. 3A illustrates an exemplary case where an object in the center of the left image (frame or screen) has moved to the right in the right image (frame or screen). In FIG. 3A, V1 indicates a motion compensation vector for the object. The object in this example does not move by itself. Therefore, it is possible to detect a movement in the image by setting a search range around a position that is obtained by moving the object based on a motion vector of the camera 2. A motion compensation vector obtained in this case becomes the same as the motion vector of the camera 2. When an object is moving, a tentative current position of the object, which is based on an assumption that the camera 2 is not moved, can be obtained based on the most recent moving direction and moving speed of a part of an image corresponding to the object. The current position of the object can be predicted by applying a motion vector of the camera 2 to the tentative current position of the object.

Figure 3B:
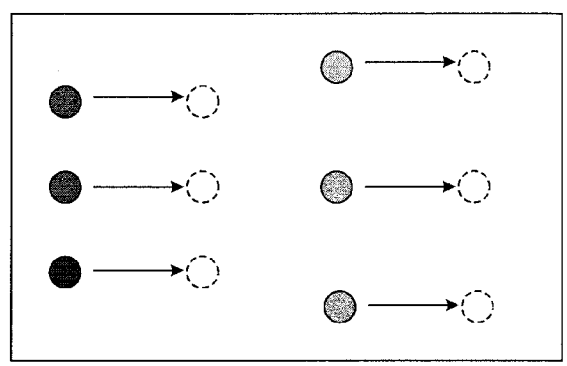

FIG. 3B illustrates an exemplary case where the camera lens has no distortion and all parts of an image (frame or screen) move by an amount that is the same as a motion vector of the camera 2. In this case, a search range can be set by applying the same motion vector of the camera 2 to a predicted movement of each part of the immediately-preceding image (frame or screen).

Figure 4:
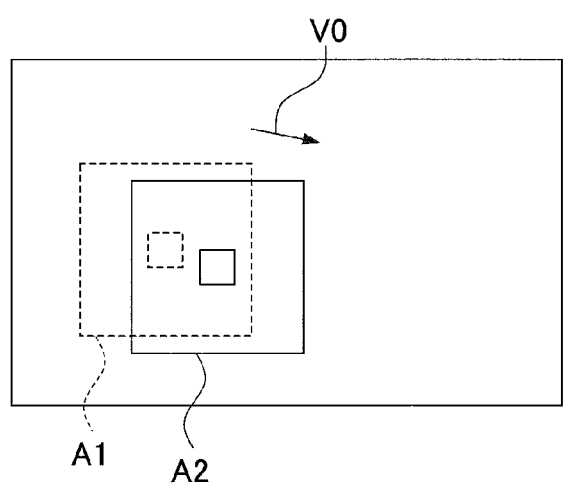
FIG. 4 is a drawing used to describe a motion vector of a camera and a search range.

FIG. 4 illustrates an exemplary relationship between a motion vector of the camera 2 and a search range. In FIG. 4, A1 indicates a search range obtained without taking into account the movement of the camera 2, and A2 indicates a search range obtained by translating the search range A1 by a motion vector V0 of the camera 2.

Figure 5A:
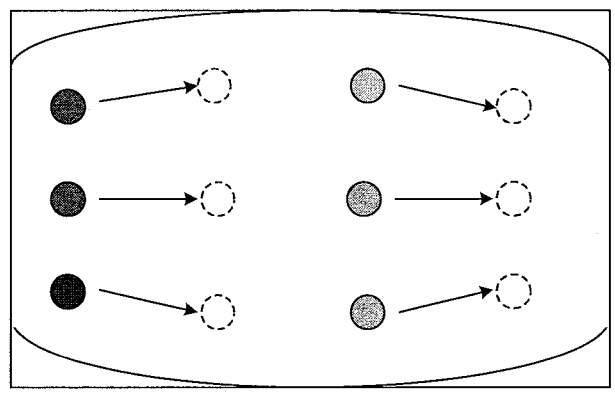
FIG. 5A and FIG. 5B are drawings used to describe a motion compensation vector.
Figure 5B:
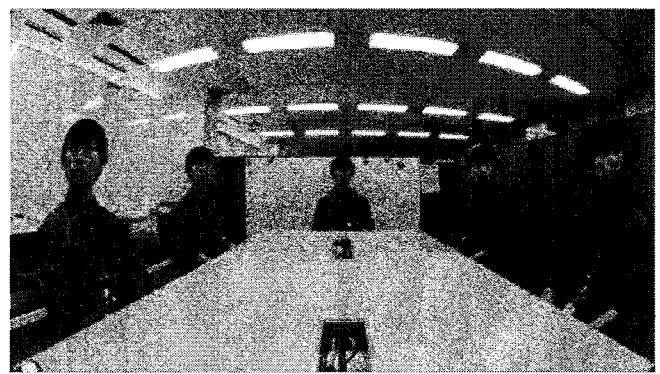

FIG. 5A illustrates a case where an image (frame or screen) is distorted by a wide angle lens, and parts of the image are caused to move differently by a movement of the camera 2. FIG. 5B is an exemplary image distorted by a wide angle lens.

When an image is distorted, a search range cannot be set by applying the same motion vector of the camera 2 to a predicted movement of each part of the immediately-preceding image.

Figure 6:
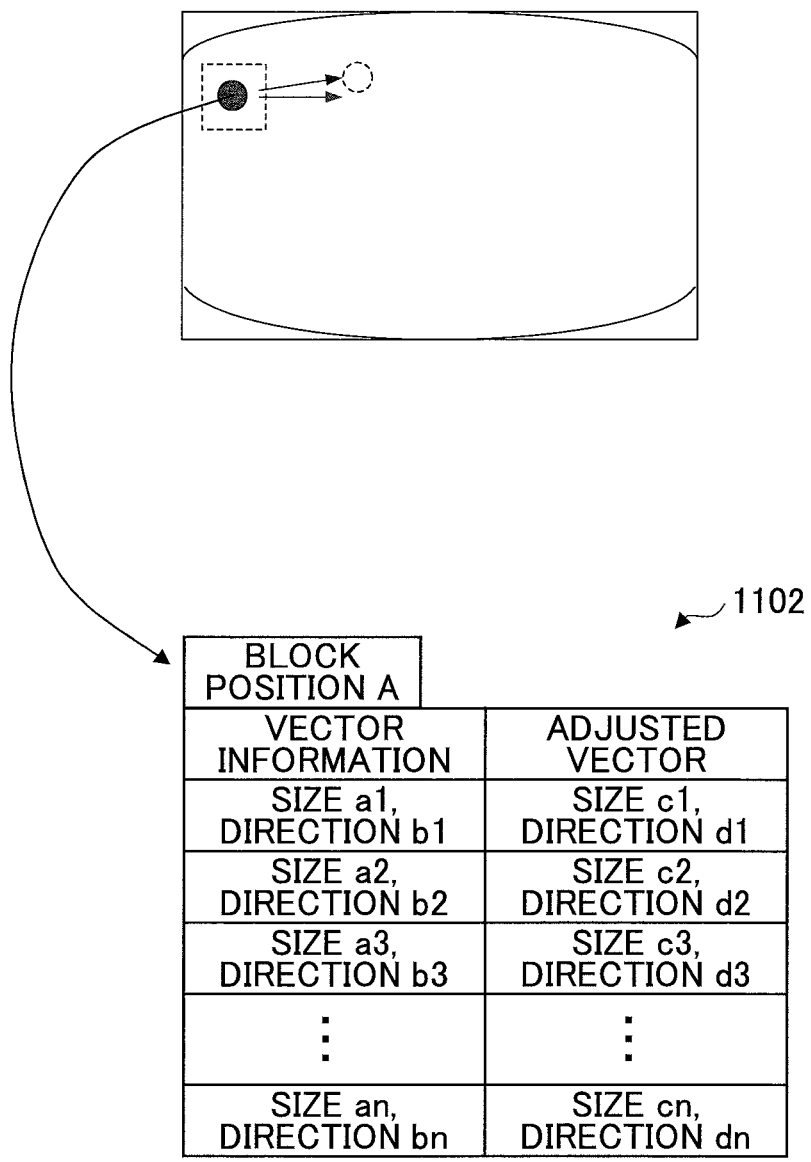
FIG. 6 is a drawing illustrating an exemplary adjustment table.

For this reason, in the present embodiment, an adjustment table 1102 is provided (e.g., stored in a memory) as illustrated by FIG. 6. The adjustment table 1102 stores, for each block position (or coordinate position) in a frame (image or screen), original "vector information" in association with "adjusted vector" that is adjusted taking into account a lens characteristic. A motion vector of the camera 2 is adjusted (or corrected) for each block position (or coordinate position) in the frame based on the adjustment table 1102, and the adjusted vector is applied to a predicted movement of the corresponding part of the immediately-preceding frame to set a search range. The search range is set to include a predicted position of each moved part of the frame. Here, setting a wider search range increases the probability of detecting a motion compensation vector, but also increases targets of image comparison and reduces the processing efficiency. Therefore, it is preferable to set a proper search range taking into account the processing efficiency.

Instead of the adjustment table 1102 illustrated by FIG. 6, a formula may be provided for each block position in the frame. Formulas for block positions may be represented by a matrix.

Referring back to FIG. 2, the motion compensation inter-frame prediction unit 1101 performs motion compensation inter-frame prediction for each image frame of an input image signal (data or information). In motion detection for motion compensation, a one-frame-preceding image signal (data or information) and an input image signal (data or information) stored in the frame memory 1103 are divided into blocks with a predetermined size, and a corresponding block in the one-frame-preceding image signal (data or information) is detected for each block in the input image signal (data or information) (i.e., blocks in the one-framepreceding image signal from which blocks in the input image signal have moved are detected).

The motion compensation inter-frame prediction unit 1101 refers to the adjustment table 1102 based on a camera movement amount signal (data or information) (i.e., a motion vector) input from the camera controller 12, adjusts the motion vector for each block, and sets a search range based on the adjusted motion vector to efficiently detect a motion compensation vector. The motion compensation vector detected for each block is output as a motion compensation signal (data or information).

When a stepping motor is used for panning and tilting the camera 2 (or rotating the camera 2 in the horizontal and vertical directions), the camera controller 12 can calculate the amount and direction of movement of the camera 2 based on control information (e.g., a pulse table, the number of steps) of the stepping motor and generate a camera movement amount signal (data or information). When the camera 2 is panned and tilted (or rotated in the horizontal and vertical directions) by using a DC motor or manually, a rotary encoder may be provided on a driving unit of the camera 2. In this case, the camera 2 can calculate the amount and direction of movement of the camera 2 based on information obtained by reading a grating (or slit) pattern of the rotary encoder with a transmission sensor.

The motion compensation inter-frame prediction unit 1101 reads a predicted value from the frame memory 1103. The predicted value is obtained by moving an object in a previous frame (image or screen), which is encoded one frame before, based on a detected motion compensation vector. Next, the subtractor 1104 obtains a difference between an input frame (image or screen) and the predicted value for inter-frame prediction coding.

Then, a prediction error signal (data or information) output from the subtractor 1104 is input via the switch 1106 to the orthogonal transformation unit 1107 that performs orthogonal transformation on the prediction error signal (data or information). The orthogonal transformation is performed to reduce the number of transmission bits based on high correlation between adjacent pixels.

The orthogonal transformation unit 1107 outputs an orthogonal transformation coefficient obtained by performing orthogonal transformation on the prediction error signal. The quantization unit 1108 quantizes the orthogonal transformation coefficient according to a quantization level received from the encoding control unit 1109 to reduce the amount of information.

The quantization unit 1108 outputs the quantization result as an encoded output signal (data or information) to the outside as well as to the reverse quantization unit 1110. The encoded output signal (data or information) is included in transmission data together with a motion compensation signal (data or information).

The reverse quantization unit 1110 performs a process that is opposite to the process performed by the quantization unit 1110, and outputs an orthogonal transformation coefficient to the inverse orthogonal transformation unit 1111 that performs inverse orthogonal transformation on the orthogonal transformation coefficient.

To improve the processing efficiency, similarly to the case of the motion detection for motion compensation, the above calculations and operations are also performed by dividing an image into blocks with a predetermined size.

The adder 1112 adds an output from the inverse orthogonal transformation unit 1111 to a predicted value read via the switch 1105 from the frame memory 1103 and stores the result in the frame memory 1103. Thus, an input image signal (data or information) used for inter-frame prediction for the next input frame (image or screen) is encoded according to a coding loop as described above.

When obtaining an original image (frame or screen) from an encoded output signal (data or information) and a motion compensation signal (data or information) generated through the above process, blocks in a previous frame (image or screen) are moved based on the motion compensation signal (data or information) (i.e., vector data), and the resulting image (frame or screen) is combined with an image obtained by decoding the encoded output signal (data or information) (i.e., differential data) to reproduce the original image (frame or screen).

<Summary>

As described above, according to the present embodiment, a motion vector of a camera is adjusted for each area (or block) in a frame (image or screen) taking into account a lens characteristic (or a geometric distortion caused by a lens) to optimize a search range. This configuration or method makes it possible to reduce an error in an inter-frame prediction image calculated by motion compensation and improve the coding efficiency without increasing the processing load for detecting a motion compensation vector. In other words, the present embodiment makes it possible to efficiently detect a motion compensation vector.

An aspect of this disclosure provides a video transmission apparatus that can reduce an error in an inter-frame prediction image calculated by motion compensation and improve the coding efficiency. This disclosure may also be applied to a video transmission method and a non-transitory computer-readable storage medium (e.g., a CD-ROM, a USB memory, or a DVD) storing a program for causing a computer to perform the video transmission method.

A video transmission apparatus according to an embodiment of the present invention is described above. However, the present invention is not limited to the disclosed embodiment, and variations and modifications may be made without departing from the scope of the present invention.

What is claimed is:

1. A video encoding method, comprising:
    obtaining camera movement amount data indicating an original direction and an original amount of movement of a camera;
    performing motion compensation on image data received from the camera, based on a motion compensation vector that indicates movement of part of an image between a preceding frame and a current frame;
    determining an image search range for the motion compensation based on the camera movement amount data;
    dividing a frame into a plurality of blocks;
    setting an adjusted motion vector for each block among the plurality of blocks; each adjusted motion vector including an adjusted direction and an adjusted amount of movement of the camera; and
    wherein each adjusted motion vector is set by adjusting a corresponding original motion vector for each block among the plurality of blocks, according to a focal length of a lens of the camera; each original motion vector including an original direction and an original amount of movement of the camera;
    wherein the adjusted direction of each adjusted motion vector is set by adjusting the original direction of the corresponding original motion vector, and the adjusted amount of each adjusted motion vector is set by adjusting the original amount of the corresponding original motion vector; and wherein the image search range for the motion compensation is determined based on the adjusted motion vectors.

2. The video encoding method as claimed in claim 1, wherein the camera movement amount data is obtained from control data for panning and tilting the camera.

3. The video encoding method as claimed in claim 1, wherein the camera movement amount data is obtained from a sensor attached to a motor for panning and tilting the camera.

4. The video encoding method as claimed in claim 1, wherein the motion vector is adjusted according to an adjustment table provided for each block position in the image data.

5. The video encoding method as claimed in claim 1, wherein the motion vector is adjusted according to a formula provided for each block position in the image data.

6. The video encoding method as claimed in claim 1, wherein an adjustment table stores, for each block position, original vector information in association with adjusted vector information, the adjusted vector information based on the focal length of the lens of the camera.

7. The video encoding method as claimed in claim 6, wherein the original vector information contains an original vector amount and an original vector direction for each block, and wherein the adjusted vector information contains an adjusted vector amount and an adjusted vector direction for each block.

8. The video encoding method as claimed in claim 1, wherein the lens of the camera has a characteristic by which different parts of an image move differently in response to a movement of the camera.

9. A non-transitory computer-readable storage medium storing therein a program for causing a computer to execute a process, the process comprising:
  obtaining camera movement amount data indicating an original direction and an original amount of movement of a camera;
  performing motion compensation on image data received from the camera, based on a motion compensation vector that indicates movement of part of an image between a preceding frame and a current frame;
  determining an image search range for the motion compensation based on the camera movement amount data;
  dividing a frame into a plurality of blocks; and
  setting an adjusted motion vector for each block among the plurality of blocks;
  each adjusted motion vector including an adjusted direction and an adjusted amount of movement of the camera; and
  wherein each adjusted motion vector is set by adjusting a corresponding original motion vector for each block among the plurality of blocks, according to a focal length of a lens of the camera; each original motion vector including an original direction and an original amount of movement of the camera;
  wherein the adjusted direction of each adjusted motion vector is set by adjusting the original direction of the corresponding original motion vector, and the adjusted amount of each adjusted motion vector is set by adjusting the original amount of the corresponding original motion vector; and wherein the image search range for the motion compensation is determined based on the adjusted motion vectors.

10. The non-transitory computer-readable storage medium as claimed in claim 9, wherein the camera movement amount data is obtained from control data for panning and tilting the camera.

11. The non-transitory computer-readable storage medium as claimed in claim 9, wherein the camera movement amount data is obtained from a sensor attached to a motor for panning and tilting the camera.

12. The non-transitory computer-readable storage medium as claimed in claim 9, wherein the motion vector is adjusted according to an adjustment table provided for each block position in the image data.

13. The non-transitory computer-readable storage medium as claimed in claim 9, wherein the motion vector is adjusted according to a formula provided for each block position in the image data, the formula using the focal length of the lens of the camera.

14. The non-transitory computer-readable storage medium as claimed in claim 9, wherein an adjustment table stores, for each block position, original vector information in association with adjusted vector information, the adjusted vector information based on the focal length of the lens of the camera.

15. The non-transitory computer-readable storage medium as claimed in claim 14, wherein the original vector information contains an original vector amount and an original vector direction for each block, and wherein the adjusted vector information contains an adjusted vector amount and an adjusted vector direction for each block.

16. The non-transitory computer-readable storage medium as claimed in claim 9, wherein the lens of the camera has a characteristic by which different parts of an image move differently in response to a movement of the camera.

17. A video encoding method, comprising:
  obtaining camera movement amount data indicating a direction and an amount of movement of a camera;
  performing motion compensation on image data received from the camera;
  determining an image search range for the motion compensation based on the camera movement amount data;
  adjusting a motion vector indicated by the camera movement amount data for each coordinate position in the image data according to a focal length of a lens of the camera; and
  dividing a frame into a plurality of blocks;
  wherein, for each block among the plurality of blocks, an amount and a direction for one of the adjusted motion vectors is set, the amount and the direction of each adjusted motion vector respectively corresponding to an amount and a direction of the motion vector;
  wherein the image search range for the motion compensation is determined based on the adjusted motion vectors; and
  wherein the lens of the camera has a characteristic by which different parts of an image move differently in response to a movement of the camera.

* * * * *